United States Patent [19]
Oguchi et al.

[11] Patent Number: 5,793,040
[45] Date of Patent: *Aug. 11, 1998

[54] INFORMATION PROCESSING APARATUS EFFECTING PROBE POSITION CONTROL WITH ELECTROSTATIC FORCE

[75] Inventors: Takahiro Oguchi, Yamato; Kunihiro Sakai, Isehara, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 586,090

[22] Filed: Jan. 16, 1996

[30] Foreign Application Priority Data

Jan. 13, 1995 [JP] Japan ............................ 7-021215

[51] Int. Cl.⁶ .................................................. H01J 37/28
[52] U.S. Cl. ............................................................ 250/306
[58] Field of Search ......................... 250/306, 307, 250/423 F; 364/126; 73/105

[56] References Cited

U.S. PATENT DOCUMENTS

| | | | |
|---|---|---|---|
| 4,726,318 | 2/1988 | Binnig | 250/306 |
| 4,806,755 | 2/1989 | Duerig et al. | 250/306 |
| 4,883,859 | 11/1989 | Hosoki et al. | 250/306 |
| 4,922,756 | 5/1990 | Henrion | 73/517 |
| 5,107,112 | 4/1992 | Yanagisawa et al. | 250/306 |
| 5,132,533 | 7/1992 | Kawase et al. | 250/306 |
| 5,144,128 | 9/1992 | Hasegawa et al. | 250/306 |
| 5,149,989 | 9/1992 | Oguchi et al. | 307/311 |
| 5,150,035 | 9/1992 | Nose et al. | 324/71.1 |
| 5,220,555 | 6/1993 | Yanagisawa et al. | 369/124 |
| 5,283,437 | 2/1994 | Greschner et al. | 250/306 |
| 5,287,342 | 2/1994 | Kishi et al. | 369/126 |
| 5,299,184 | 3/1994 | Yamano et al. | 369/44.28 |
| 5,338,932 | 8/1994 | Theodore et al. | 250/306 |
| 5,396,066 | 3/1995 | Ikeda et al. | 250/306 |
| 5,485,451 | 1/1996 | Yamano et al. | 369/126 |

FOREIGN PATENT DOCUMENTS

| | | |
|---|---|---|
| 0 247 219 | 12/1987 | European Pat. Off. . |
| 0325056 | 7/1989 | European Pat. Off. . |
| 0 363 550 | 4/1990 | European Pat. Off. . |
| 0 582 376 | 2/1994 | European Pat. Off. . |
| 0 622 562 | 11/1994 | European Pat. Off. . |
| 61-80536 | 4/1986 | Japan . |
| 62-281138 | 12/1987 | Japan . |
| 63-161552 | 7/1988 | Japan . |
| 63-161553 | 7/1988 | Japan . |
| 1-196751 | 8/1989 | Japan . |
| 06-012710 | 1/1994 | Japan . |

OTHER PUBLICATIONS

"Surface Studies by Scanning Tunneling Microscopy" by G. Binning et al. Physical Review Letters; vol. 49. No. 1., Jul. 5, 1982p pp. 57–60.

*Primary Examiner*—Kiet T. Nguyen
*Attorney, Agent, or Firm*—Fitzpatrick, Cella, Harper & Scinto

[57] ABSTRACT

An information processing apparatus utilizing a scanning tunnel microscope includes a probe, a detector for detecting the distance between the probe and an object opposed thereto, based on a physical interaction working between the probe and the object, an electrostatic actuator for displacing the probe, for adjusting the distance between the probe and the object. The electrostatic actuator includes mutually opposed two electrodes: A controller is provided for controlling the amount of charge to be accumulated between the electrodes, so as to maintain a desired distance between the probe and the object, based on the result of detection by the detector.

13 Claims, 6 Drawing Sheets

1

INFORMATION PROCESSING APARATUS EFFECTING PROBE POSITION CONTROL WITH ELECTROSTATIC FORCE

BACKGROUND OF THE INVENTION

1. Field of the Invention

The present invention relates to an information processing apparatus effecting information processing by physical interaction between a probe and a recording medium, such as a recording/reproducing apparatus or a scanning tunnel microscope (STM).

2. Related Background Art

Recent development of the scanning tunnel microscope (STM) capable of direct observation of the electron structure of the atoms at the conductor surface [G. Binning et al., Phys. Rev. Lett., 49, 57 (1982)] has enabled measurement of the real space image with a high resolving power, both in monocrystalline and amorphous materials.

The STM utilizes the tunnelling current, generated when a probe having a metal tip and a conductive substance are brought to a small distance of about 1 nm, with a voltage applied therebetween. This current is extremely sensitive to the distance between the both, and various information on the entire electron cloud in the real space can be read by moving the tip in a scanning motion so as to maintain the tunnelling current constant. In such operation, there can be obtained a resolving power of about 0.1 nm, in the longitudinal direction along the surface of the conductive substance.

Consequently, utilizing the principle of the STM, there can be achieved information recording and reproduction with a high density sufficiently in the atomic (subnanometric) order.

For example an information recording/reproducing apparatus disclosed in the Japanese Patent Laid-open Application No. 61-80536 effects information recording by removing atoms absorbed on the surface of a medium with an electron beam or the like, and reproduction of the recorded data by the STM.

There is also proposed, as disclosed in the Japanese Patent Laid-open Application Nos. 63-161552 and 63-161553, a method of effecting information recording and reproduction with the STM, utilizing, as a recording layer, a material with a memory effect for the voltage-current switching, such as a thin film of organic compounds having π-electrons or chalcogenide compounds.

Such method enables information recording and reproduction of a high density, as high as $10^{12}$ bit/cm$^2$, with a record bit size of 10 nm.

Furthermore, there is proposed, as disclosed in the Japanese Patent Laid-open Application No. 1-196751, an information recording apparatus which is provided with plural probes on a semiconductor substrate for the purpose of compactization and moves a recording medium relative to the probes.

For example, by combining a multi-probe head, having 2500 probes arranged in a 50×50 matrix on a silicon chip of 1 cm$^2$ square, and a material with the above-mentioned memory effect, there can be achieved recording and reproduction of digital data of 400 Mbits per probe, or a total recording capacity of 1 Tbits.

Also there is proposed, in the Japanese Patent Laid-open Application No. 62-281138, a memory apparatus employing the above-mentioned integrated probe head, in which distance control to the medium is achieved by constructing each probe as a cantilever of a length of several hundred microns and driving it with an electrostatic actuator.

In practice, however, the information recording and reproduction by the combination of such probe and the recording medium opposed thereto have been associated with the following drawbacks.

For information processing such as recording and reproduction, there is required precise distance control between the probe and the medium opposed thereto.

For example, in case an electrostatic actuator is employed for the probe position control, there is known a method of controlling the position by controlling the voltage applied to the electrode generating the electrostatic force.

In such method, the generated force varies, even in the absence of variation in the applied voltage, if there is a variation in the distance of the electrodes generating the electrostatic force.

As the generated electrostatic force abruptly increases in substantially inverse proportion to the distance of the electrodes generating the electrostatic force, the electrodes may come into mutual contact by the generated force if the electrodes are positioned close, whereby the control becomes impossible.

For avoiding such situation, the actuator utilizing the electrostatic force has been designed, for example, with a distance between the electrodes larger than the controlled distance, thereby reducing the variation in the distance of the electrodes in relative manner.

For increasing the stroke of the actuator in such designing, it is necessary to increase the driving voltage or to reduce the elastic constant or moment of rotation of the actuator. Such method, however, is undesirable because of the increase in the required driving power or the lack of freedom in the designing of the actuator.

SUMMARY OF THE INVENTION

In consideration of the foregoing, the object of the present invention is to provide an information processing apparatus, such as an information recording/reproducing apparatus or a scanning tunnel microscope (STM), capable, in the electrostatic probe position control, of stable position control even when the distance of the electrodes is reduced.

The above-mentioned object can be attained, according to the present invention, by an information processing apparatus comprising:

a probe;

means for detecting the distance between said probe and an object opposed thereto, based on a physical interaction occurring between said probe and said object;

an electrostatic actuator for displacing said probe for adjusting the distance between said probe and said object, said actuator being provided with mutually opposed two electrodes; and control means for so controlling the amount of charge to be accumulated between said electrodes as that the distance between said probe and said object becomes a desired value, based on the result of detection by said detection means.

Other objects of the present invention, and the features thereof, will become fully apparent from the following description of the embodiments.

DETAILED DESCRIPTION OF THE PREFERRED EMBODIMENTS

The present invention employs, in the electrostatic actuator, a control by charge amount instead of the conventional control by voltage. Such control method enables stable control even when the driving electrodes are provided mutually close.

In the following there will be briefly explained the principle of the control method of the present invention. For the purpose of simplicity, there is considered a force F generated when a voltage V is given to two conductors having an area S and separated by a gap d.

At first there is considered the force F, generated when such flat-plate capacitor is driven with an applied voltage V.

If the energy of the flat-plate capacitor varies by $\Delta W$ as a result of a given displacement $\Delta z$, with a capacity change $\Delta C$ and a variation $\Delta Q$ of the charge amount in the capacitor, there stands a relation:

$$\Delta W = -F \cdot \Delta z + V \cdot \Delta Q$$

since $\Delta W = \frac{1}{2} \cdot \Delta C \cdot V^2$ and $\Delta Q = V \cdot \Delta C$, there is obtained:

$$F = \frac{1}{2} V^2 \cdot dC/dz \quad (1)$$

From the equation (1), there is derived:

$$F = -\frac{1}{2} \epsilon O \cdot S \cdot (V/d)^2 \quad (2)$$

wherein $\epsilon O$ is the dielectric constant of vacuum.

As will be apparent from the equation (2), the generated force varies in proportion to the square of the applied voltage, and the electrostatic force also varies significantly by the variation in the gap d. Consequently, the actuator driven by the electrostatic force in the z-direction is subjected to an enhanced attractive force when the electrodes come closer by the drive.

On the other hand, the flat-plate capacitor is subjected to the following force when it is driven based on the charge amount C accumulated therein. For a change $a\Delta C$ of the capacity C for a distance change $\Delta z$ of the electrodes, there stand relations:

$$\Delta W = -F \cdot \Delta z$$

$$F = \frac{1}{2} \cdot (Q/C)^2 \cdot dC/dz \quad (3)$$

From the equation (3), there is obtained:

$$F = -1/(2 \cdot \epsilon O \cdot S) \cdot Q^2 \quad (4)$$

According to the equation (4), the generated electrostatic force is not affected by the variation in the gap d.

Consequently, strong electrostatic force is not generated between the electrodes in the control by the charge amount, even when the electrodes come close.

In the following there will be explained embodiments of the present invention, with reference to the attached drawings.

Figure 1:
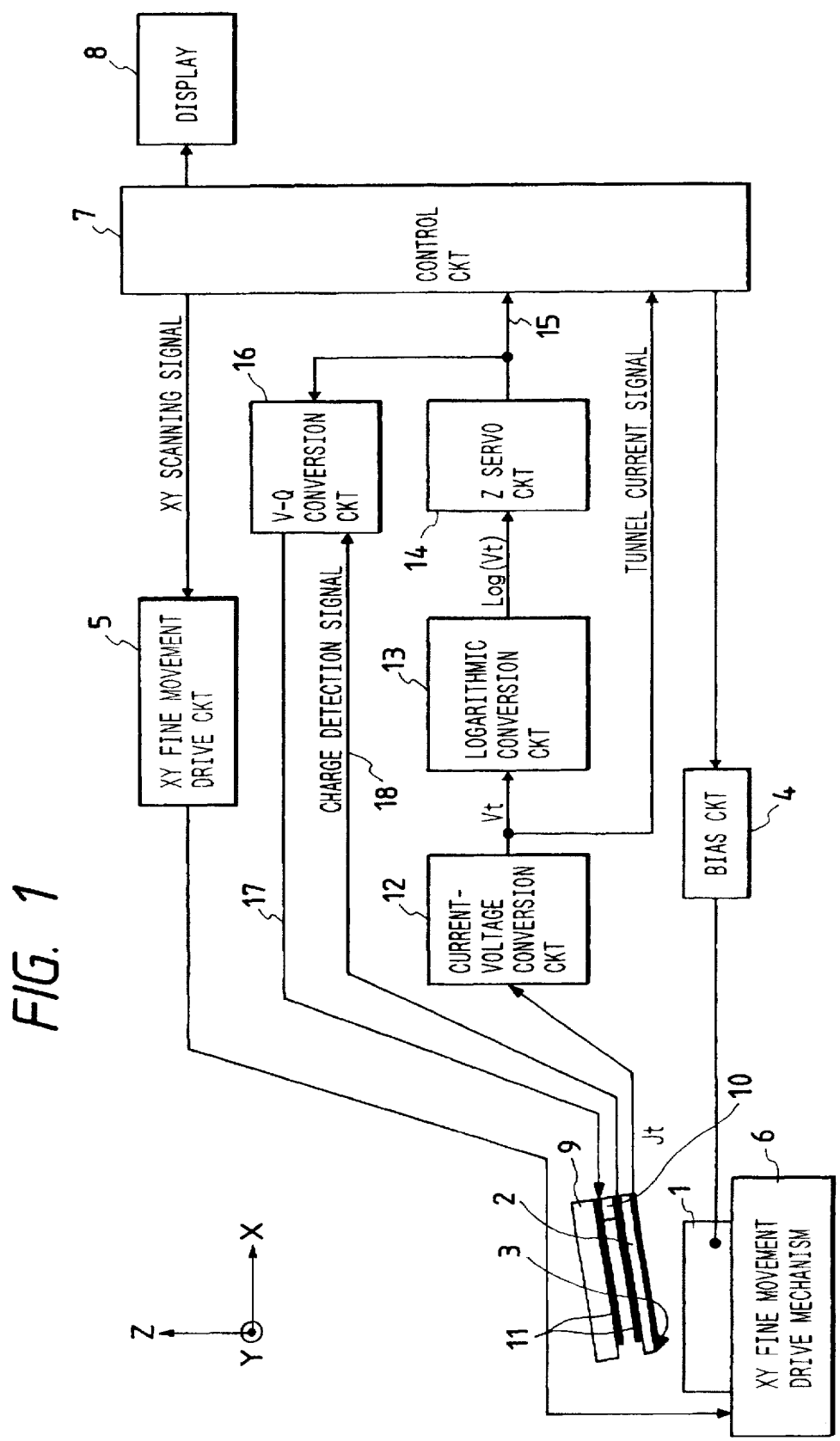
FIG. 1 is a block diagram of a scanning tunnel microscope of an embodiment 1 of the present invention.

FIG. 1 illustrates an embodiment 1 of the present invention. The STM of the present embodiment is to detect the tunnelling current generated when a bias voltage is applied between an observed specimen and a probe opposed thereto. There are illustrated an observed specimen 1 and a probe 2 positioned close thereto. The probe 2 is mounted on an unrepresented Z-fine movement drive mechanism such as a laminated piezoelectric element, and constitutes a cantilever actuator drivable in the Z-direction by the electrostatic force, under the application of a voltage. At the end of the cantilever there is formed a pointed conductive tip 3, for detecting the tunnelling current flowing between the tip and the observed specimen.

The above-mentioned probe is constructed in the following manner. The probe 2 is constructed as a cantilever drivable by the electrostatic force. The cantilever probe is formed on a support member 9, across an insulating layer 10, and the probe 2 moves in the Z-direction by the application of an actuator drive signal between drive electrodes 11 formed on the support member 9 and the probe 2.

In the observation of the surface of the specimen, the Z-fine drive mechanism is activated under the application of a bias voltage by a bias circuit 4 between the probe 2 and the specimen 1 to bring the probe so close to the specimen as to generate a tunnelling current, and the probe 2 is servo controlled as to maintain a constant distance between the probe and the specimen.

In this state the surface observation is conducted by two-dimensional scanning motion of an XY fine movement drive mechanism 6 through an XY fine movement drive circuit 5.

Thus the tunnelling current Jt, varying by the small irregularities on the specimen surface, is detected. This current is fetched in a control circuit 7 and is processed in synchronization with xy scanning signals to obtain an STM image.

The STM image is subjected to image processing, such as two-dimensional FFT, to obtain a tunnelling current image and a topographic image (distance control signal image), which are supplied to a display 8.

Also the location of observation may be changed by moving the specimen in the X- and Y-directions by an unrepresented XY coarse movement drive mechanism, so as to move the probe 2 to a desired area of observation.

The control circuit effects servo operation, at the observation of the specimen, so as to maintain a constant distance between the probe and the specimen.

In FIG. 1, the tunnelling current Jt detected by the probe 2 is converted into a voltage by a current-voltage conversion circuit 12. The output Vt of the current-voltage conversion circuit 12 is supplied to a logarithmic conversion circuit 13, of which output Log(Vt) is supplied to a Z-servo circuit 14.

Based on the output Log(Vt) of the logarithmic conversion circuit, the Z-servo circuit 14 releases a distance control signal 15 so as to maintain a constant distance between the probe and the specimen.

A V-Q conversion circuit 16 converts the distance output signal 15 into an actuator control signal 17, for supply to an electrostatic drive electrode for driving the probe in the z-direction. The probe and the specimen are maintained at a constant distance by the electrostatic drive of the actuator by this control signal.

Figure 2:
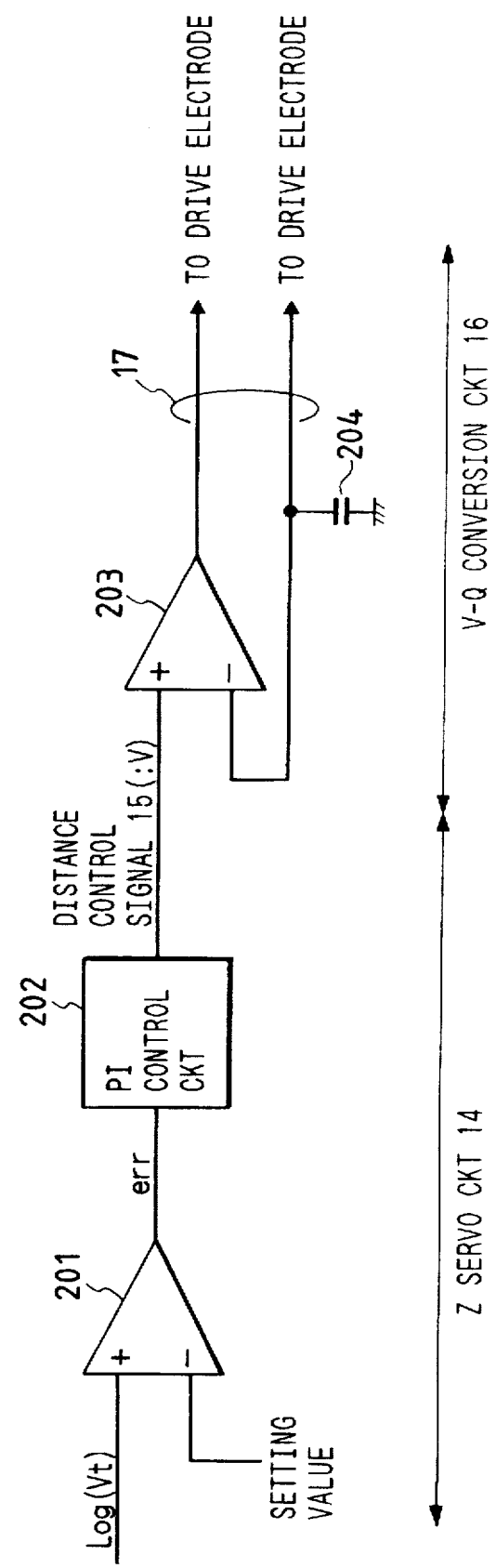
FIG. 2 is a circuit diagram of a Z-control circuit shown in FIG. 1.

In the following there will be explained, with reference to FIG. 2, the Z-servo circuit 14 and the V-Q conversion circuit 16 featuring the present invention. Referring to FIG. 2, the output Log(Vt) of the logarithmic conversion circuit 13 is supplied to the Z-servo circuit 14. When the current between the probe and the medium is a tunnelling current, the output Log(Vt) is proportional to the distance signal between the probe and the medium. The Z-servo circuit 14 releases the distance control signal 15 so as to maintain this distance constant. At first the output Log(Vt) is supplied to a subtractor 201, and is converted to an error signal err by the subtraction of a preset value ZO. Then the error signal err enters a PI control circuit 202 and is subjected to proportional integration therein to generate the distance control signal 15 (:V). The PI control circuit 202 generates the following control signal, in response to the input signal err:

$$V = Kp \cdot err + Ki \cdot \int err \quad (5)$$

wherein Kp and Ki are control parameters.

This distance control signal 15 is converted by the V-Q conversion circuit 16, in FIG. 1, into the actuator control signal 17, which is a charge control signal and is applied between the drive electrodes for generating the electrostatic force.

As explained in the foregoing, according to the present invention, the charge amount between the electrostatic drive electrodes is controlled. The voltage-charge (V-Q) conversion circuit 16 therefor will be explained in the following. The V-Q conversion circuit converts the input voltage signal into a charge signal which controls the charge amount accumulated in a capacitor formed between the electrostatic drive electrodes, thereby controlling the electrostatic actuator.

Referring to FIG. 2, the V-Q conversion circuit is provided with a small capacitor 204, for detecting the leak current, serially with the capacitor formed between the electrostatically driven electrodes. An operational amplifier 203 so functions as to accumulate a charge:

$$Q = V \cdot Cx$$

in the capacitor formed by the probe, wherein V is the input voltage of the operational amplifier and Cx is the capacitance of the above-mentioned detecting capacitor. Consequently, the voltage-charge conversion is executed by giving an input voltage V to the operational amplifier 203, whereby the capacitor formed between the probe driving electrodes is controlled by the charge amount.

In the present embodiment, the actuator for driving the probe in the Z-direction is composed of a cantilever actuator drivable in the Z-direction by the electrostatic force. The Z-displacement of the electrostatically driven cantilever is defined in the following manner, for a cantilever with a width W, a length L and a thickness t, and for a charge amount Q between the drive electrodes.

The displacement 6 (or variation in the gap) of the probe end in the Z-direction is given by:

$$\delta = \tfrac{3}{4} \times 1/(\epsilon O \cdot E) \times L^2 \times 1/(W^2 \cdot t^3) \times Q^2 \quad (6)$$

wherein E is the Young's modulus, and $\epsilon O$ is the dielectric constant of vacuum.

Thus the amount of displacement is estimated from the equation (6), and the probe position control in the Z-direction is conducted by the control of the charge amount by the V-Q conversion circuit 16.

In the foregoing description, it is assumed that the mutually opposed electrodes are mutually parallel, but a similar consideration can be made even if one of the electrodes is inclined to the other. In case the electrodes are mutually inclined with the gap therebetween of d+a and d−a at an end and at the other, the electrostatic capacitance C in this case is given by:

$$\begin{aligned} C &= O \cdot W \cdot L/(2a) \cdot \ln\{(1 + a/d)/(1 - a/d)\} \quad (7) \\ &= O \cdot W \cdot L/d\{1 + 1/3(a/d)^2 + 1/5(a/d)^4 + \ldots\} \\ &\approx O \cdot W \cdot L/d \text{ (in case of } a < 1/5d) \end{aligned}$$

Thus the electrostatic capacitance in this case is substantially same as that in case the electrodes are mutually parallel (a=0).

Therefore, also when one of the electrodes is inclined with respect to the other, the electrostatic force generated between the electrodes can be stabilized by the charge amount control.

As explained in the foregoing, the control method for maintaining a constant charge amount between the electrostatic drive electrodes enables constant feedback control between the probe and the medium, avoiding uncontrollable situation of the actuator, thereby allowing to stably obtain the STM image.

In the foregoing embodiment, the charge amount between the drive electrodes of the actuator is monitored and controlled by the potential of a capacitor connected serially to an equivalent capacitor formed between the drive electrodes, but it is also possible, for example, to calculate the charge amount in the equivalent capacitor formed between the drive electrodes, by means of an integrating circuit, and to effect control based on thus calculated charge amount.

Figure 3:
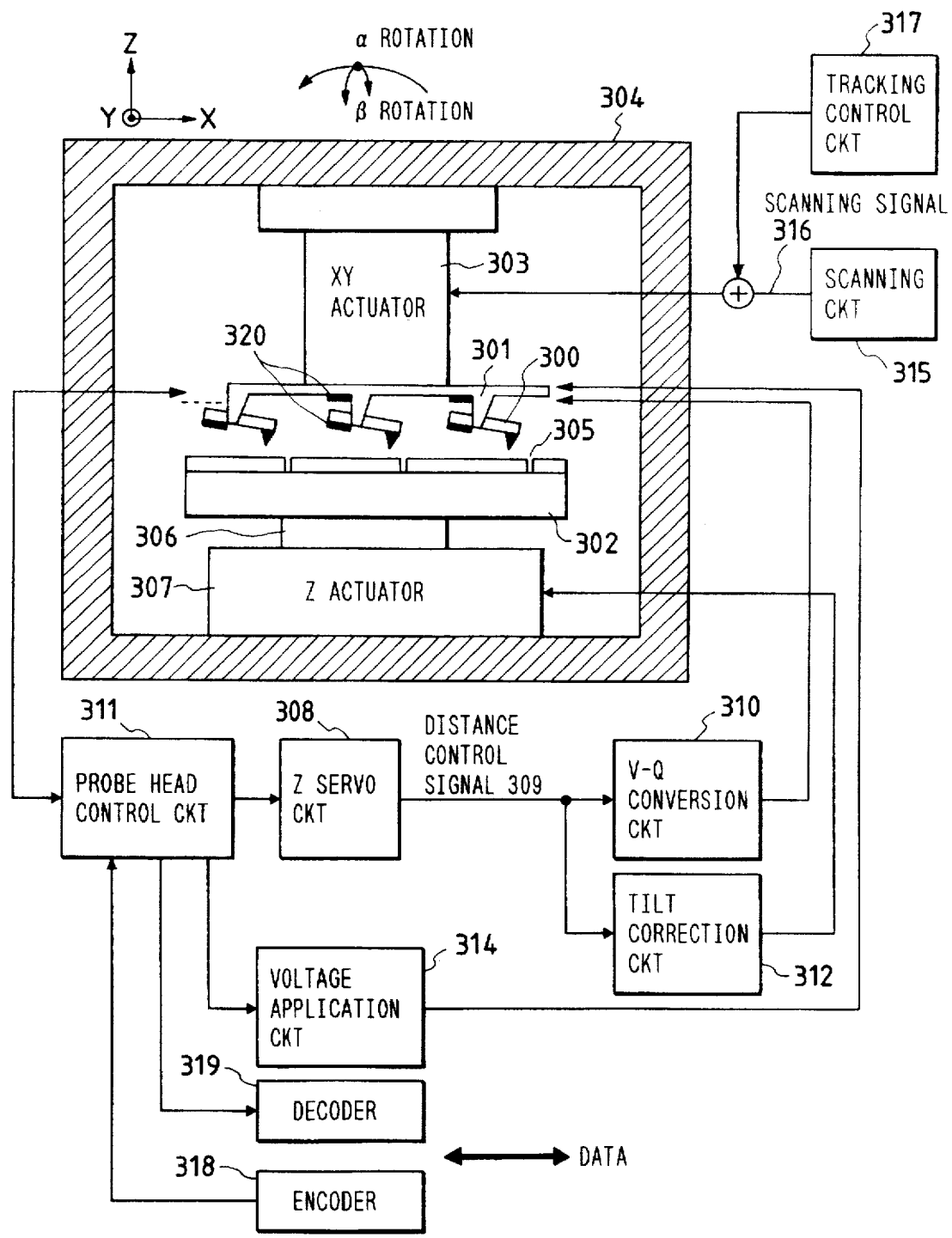
FIG. 3 is a block diagram of a recording/reproducing apparatus employing a multi-probe head constituting an embodiment 2 of the present invention.

FIG. 3 is a block diagram of an information recording/reproducing apparatus utilizing multiple probes, constituting a second embodiment of the present invention.

The recording/reproducing apparatus of the present embodiment effects information exchange by plural probes for detecting the tunnelling current generated under the application of a bias voltage between a recording medium and a probe opposed thereto.

In the following there will be explained, with reference to FIG. 3, the configuration of the above-mentioned recording/reproducing apparatus.

A multi-probe head 301, bearing 16 probes 300, is positioned close to a recording medium 302. The multi-probe head 301 is mounted, through an XY actuator 303 constituting a drive mechanism in the X- and Y-directions, on a support member 304. On the other hand, the recording medium 302 bears a tracking pattern 305 (a recessed groove pattern or a pattern of a different surfacial electronic state) and is placed on a base member 306, which is mounted, through a Z-actuator 307 capable of displacement in the Z-direction and rotations in the a- and p-directions, on the support member 304. The multi-probe head 301 is composed of silicon, bearing 16 probes in a 4×4 matrix array.

Each probe is constructed as a torsion-bar actuator, in which a flat plate portion formed on a beam supported at both ends is elctrostatically driven, utilizing the torsion elasticity of the beam supported at both ends. In contrast to the cantilever actuator of the first embodiment, this torsion-bar actuator allows independent selection of the bending elasticity of the lever and the torsion elasticity of the beam, allowing larger freedom in the designing of ridigity and resonance frequency. Also a displacement in the Z-direction is induced by the application of a voltage between drive electrodes 320. (The details of the torsion-bar actuator and the method of preparation thereof will be explained later.) At the end of the cantilever, there is formed a pointed conductive tip, for detecting the tunnelling current between the tip and the opposed recording medium.

In the following there will be explained the outline of the information recording and reproduction.

In such information recording and reproduction, the probes 300 of the multi-probe head 301 are brought so close to the opposed recording medium 302 as to induce tunnelling currents therebetween.

The tunnelling current signal from each probe is supplied through a probe head control circuit 311 to a Z-servo circuit 308, which in response generates a distance control signal 309 for maintaining a constant distance between each probe and the opposed recording medium.

The distance control signal 309, for independently driving each probe in the Z-direction, is supplied through a V-Q conversion circuit 310 to the electrodes of each actuator.

Also based on this distance control signal 309, a tilt correction circuit 312 corrects the tilt between the multi-probe head 301 and the recording medium 302.

Also at the recording and reproducing operation, a scanning circuit 315 causes, according to an XY scanning signal 316 XY scanning motions of the probe head 301 relative to the recording medium 302.

In this operation, a tracking control circuit 317 detects the edge position of the tracking pattern 305, from the variation in the tunnelling current of each probe 300 and corrects, by the XY actuator 303, the positional aberration between the tracking pattern 305 and the multi-probe head 301. In this state a voltage application circuit 314 modulates the tunnelling current between each probe and the recording medium, thereby forming recording bits on the recording medium.

Figure 4:
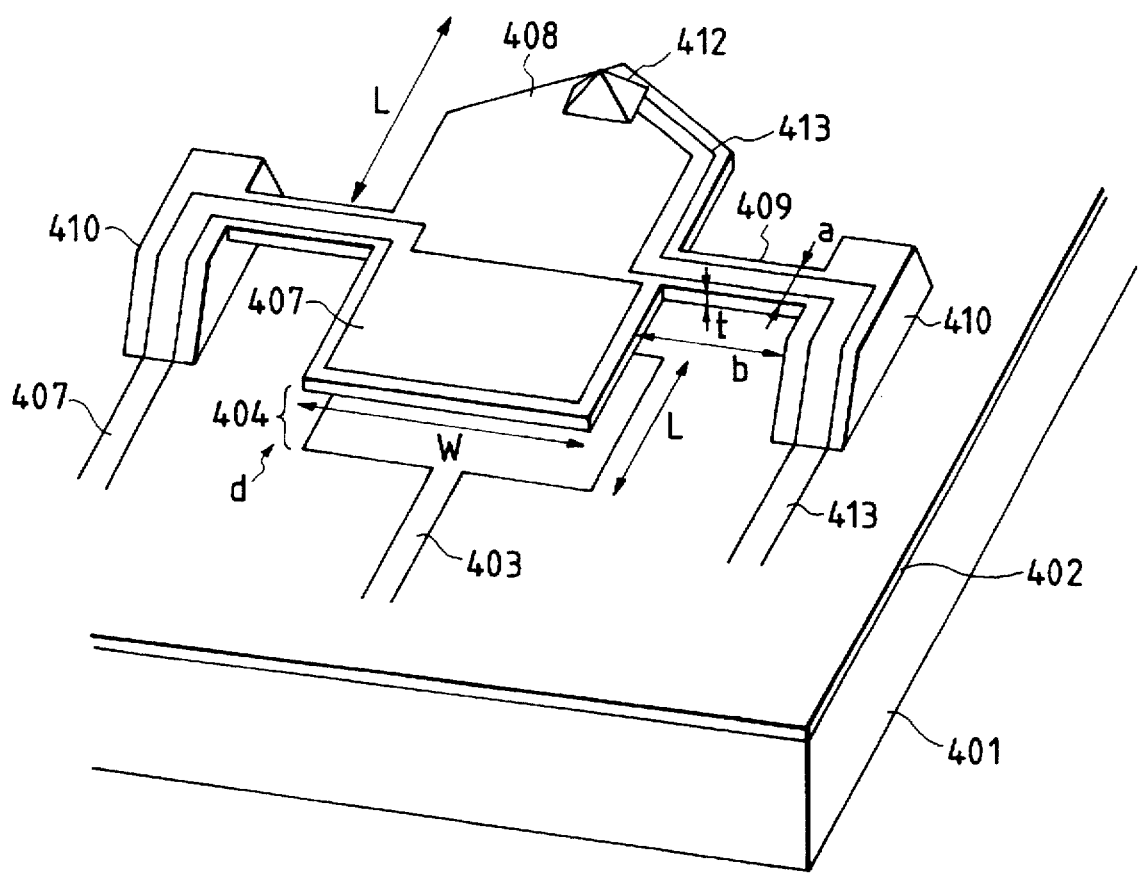
FIG. 4 is a schematic perspective view of a torsion actuator employed in the configuration shown in FIG. 3.

FIG. 4 is a perspective view showing the structure of the torsion-bar actuator employed in the present embodiment.

A mechanically movable part is formed, across a gap 404, on a substrate 401 bearing a fixed electrode 403 on an insulating layer 402.

The mechanically movable part is composed of a beam 409 for rotational support, supported at both ends, and a probe 408, and is supported by support portions 410. On the probe 408 there are formed a driving upper electrode 407, an information input/output tip 412 and an information input/output wiring 413.

The probe of the present embodiment is driven in the following manner. By the application of a voltage to the fixed electrode 403, the rear end portion of the probe is attracted toward the fixed electrode 403. Thus, by the twisting of the beam 409, the entire probe 408 rotates about the axis of the beam 409 supported at both ends, whereby the tip 412 at the front end of the probe 408 moves closer to the opposed recording medium.

Now reference is made to FIG. 5, for explaining the steps of preparation of the electrostatic actuator of the present embodiment.

At first, on a Si substrate 401, a silicon nitride film was formed with a thickness of 3000 Å by low pressure CVD (LPCVD) to constitute the insulating layer 402.

Then photoresist was coated and patterned, and Ti and Pt were deposited in succession, by sputtering, with respective thicknesses of 50 Å and 2000 Å. Subsequently the photoresist was eliminated to obtain the fixed electrode 403.

Then zinc oxide was deposited with a thickness of 20000 Å by sputtering. Subsequently photoresist was coated and patterned, and the zinc oxide was etched off with an aqueous mixed solution of hydrogen peroxide and ammonia to form a sacrifice layer 405 (FIG. 5(a)).

Then silicon oxide was deposited by sputtering with a thickness of 10000 Å.

Subsequently photoresist was coated and patterned, then Ti and Au were deposited in succession by sputtering with respective thicknesses of 50 and 2000 Å, and the photoresist was removed to form the upper electrode 407 and the tunnelling current wiring 413 (FIG. 5(b)).

Figure 5A:
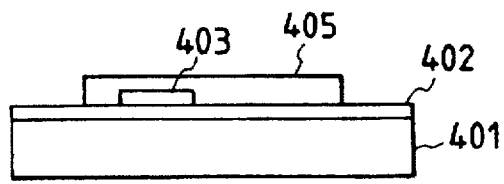
FIGS. 5(a) to 5(h) are views showing steps of preparation of the probe shown in FIG. 4.
Figure 5D:
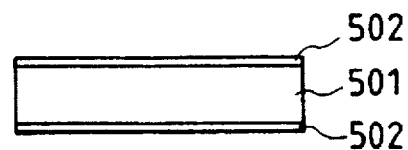
Figure 5B:
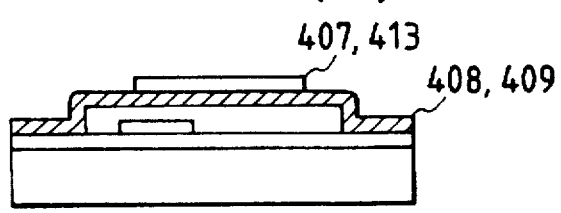
Figure 5E:
Figure 5C:
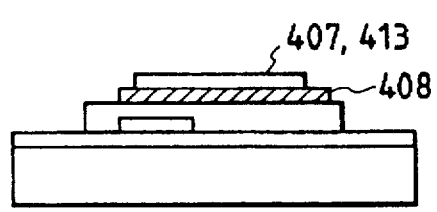
Figure 5F:
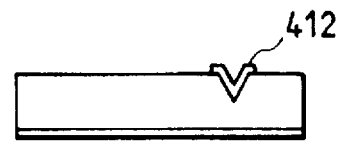

Then, after photoresist was coated and patterned, silicon oxide was etched by reactive ion etching with $CF_4$ gas to obtain the probe 408 with the mechanically movable structure (FIG. 5(c)).

In the following there will be explained the method of preparation of the information input/output tip 412. At first there is prepared a second Si substrate 501 of an orientation (100).

At first, on the surface of the second substrate 501, a silicon nitride film 502 was deposited with a thickness of 1000 Å by low pressure CVD (LPCVD) (FIG. 5(d)).

Then the silicon nitride film was photolithographically etched into the form shown in FIG. 5(e), thereby exposing the surface of the second substrate.

Then the second substrate 501 was subjected to anisotropic crystal etching with aqueous solution of potassium hydroxide heated to 100° C., thereby forming an inverse pyramidal recess 503, constituting a mold for the tip (FIG. 5(e)).

The remaining silicon nitride was removed by reactive ion etching. Then photoresist was patterned thereon, then Au was deposited with a thickness of 10000 Å by vacuum evaporation, and the photoresist was dissolved with acetone to obtain an Au pattern constituting the tip 412 (FIG. 5(f)).

Figure 5G:
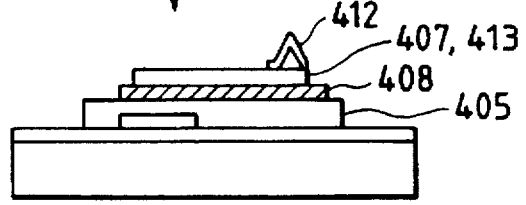

Then the tip 412 was pressed onto the substrate 401, and peeled off from the interface of the second substrate 501, thereby obtaining the information input/output tip 412 (FIG. 5(g)).

The etching of the second substrate 501 may be made not only by the anisotropic crystal etching for example of monocrystalline silicon or GaAs semiconductor, but also by the isotropic etching if there can be obtained a transferrable shape. A protective layer 502, at the etching of the second substrate 501, may be composed of any substance that can withstands the solution employed in the above-mentioned etching.

Also for reducing the adhesion between the tip 412 and the second substrate 501, there may be formed a releasing layer on the second substrate 501. Also the probe 408 formed on the first substrate 408 and the tip 412 formed on the second substrate 501 may be bonded, for example by metal-metal junction or anodic junction.

Finally the sacrifice layer 405 composed of zinc oxide was etched off with aqueous solution of acetic acid, thereby forming the gap 404 between the probe 408 and the fixed electrode 403.

Figure 5H:
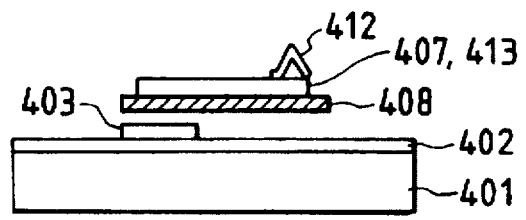

The torsion-bar probe shown in FIG. 5(h) could be obtained through the preparation steps explained above.

Such torsion-bar probes were prepared in a 4×4 matrix array, and a tunnelling current detecting amplifier was prepared by an IC process, in the vicinity of each torsion-bar probe on the Si wafer, thereby constituting the multi-probe head 301.

In the following there will be explained the configuration of the recording medium 302, opposed to the multi-probe head 301. On the recording medium 302, stripe-shaped tracking patterns are formed for example by a semiconductor process. On the electrode of the recording medium 302, there are formed grooves of a width of 200 nm and a depth of 30 nm, with a pitch of 2 μm in the X-direction and over a length of 50 μm in the Y-direction. The recording medium 302 was composed of a material showing memory effect to the voltage-current switching. The substrate electrode was composed of an epitaxially grown Au surface, formed on a flat substrate such as glass or mica. The tracking grooves were formed on the substrate electrode, and the recording medium thereon was formed by two superposed Langmuir-Brodget monomolecular films of squarilium-bis-6-octyl-azulene (SOAZ).

The control circuit of the present embodiment effects distance control between the medium and the opposed plural probes for detecting the tunnelling currents. In the present embodiment, there is formed a digital servo system for converting the tunnelling current signal from each probe into a digital signal and, based on these signals, generating Z-control signals for controlling the probes in succession, according to the timing of a probe head control circuit 311.

Figure 6:
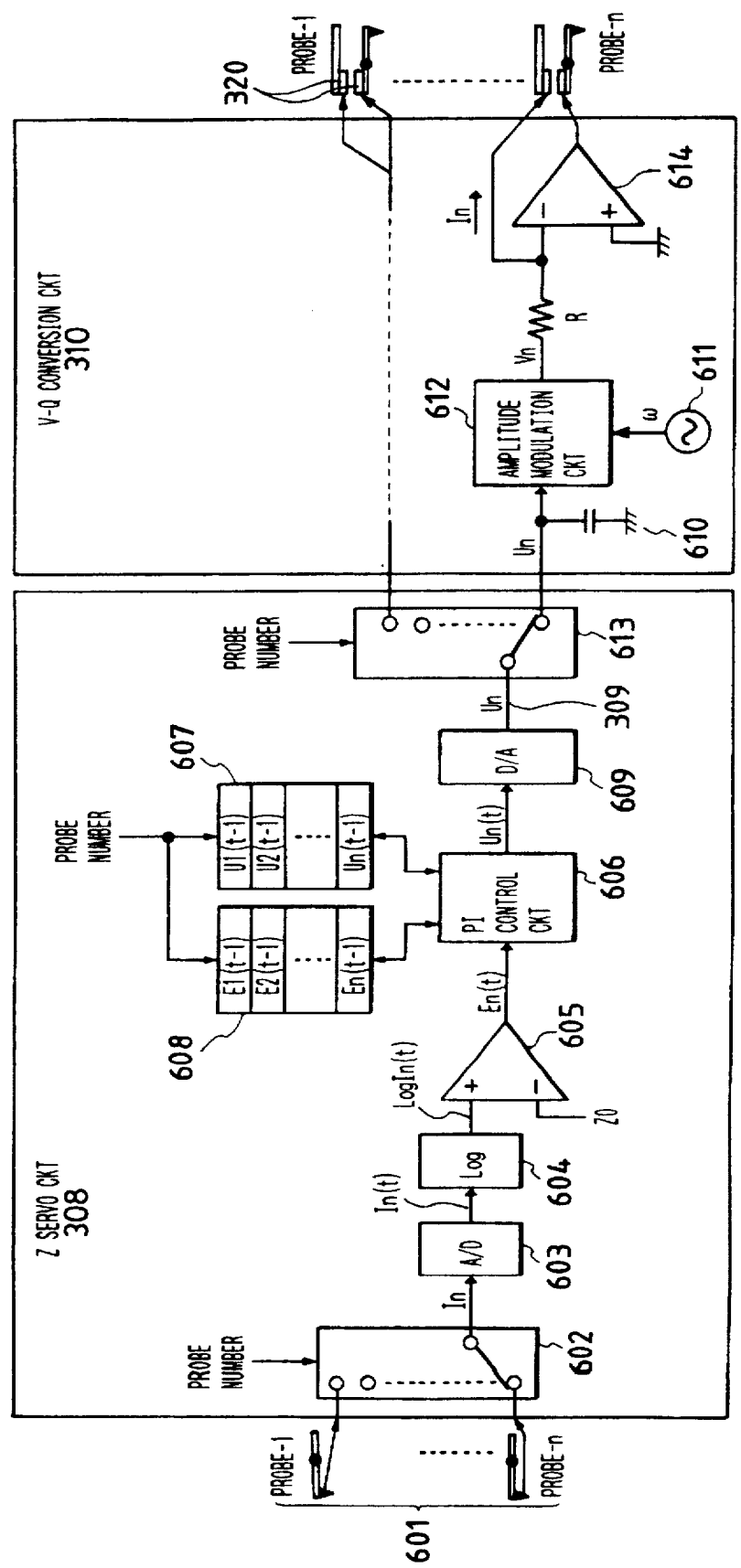
FIG. 6 is a block diagram of a Z-control system of a multiple probe head.

Now reference is made to FIG. 6 for explaining the details of the Z-control of the multiple probes.

The tunnelling current signals from the multiple probes 1–n are supplied to a selection circuit 602.

The selection circuit 602 selects, according to the control timing, one of the multiple probes 601, for example an n-th probe (In). The tunnelling current signal detected from thus selected n-th probe is converted into a voltage, then is A/D converted in an A/D converter 603 (as indicated by In(t), wherein t indicates the sampling time). Thus digitized tunnelling current signal is subjected to a linear conversion, with respect to the probe-medium distance, by the logarithmic conversion circuit 604 (LogIn(t) in FIG. 6).

The output of the logarithmic conversion circuit 604 is supplied to a subtracting comparator 605, for effecting comparison with a set value ZO of the servo circuit, thereby generating an error signal En(t).

A PI control circuit 606 generates a distance control signal Un(t) so as to bring the error signal to zero.

In this operation, the PI control circuit 606 generates a new distance control signal Un(t) at a time (t), based on the distance control signal and the corrected error signal data at a sampling time (t−1) and corrected error signal En(t) at the sampling time (t), stored in memories 607, 608, and simultaneously renews the data stored in the memories 607, 608.

The distance control signal Un(t) is again converted into an analog distance control signal 309 (Un) by a D/A converter 609, and is further converted by a V-Q conversion circuit 310 into a charge control signal, which is applied between the drive electrodes of the electrostatic actuator. The control circuit 311 effects Z-control on all the probes by switching the selected probe with the selection circuits 602, 613.

Also in this embodiment, the charge between the drive electrodes is controlled in the control of the electrostatically driven actuator, as in the foregoing first embodiment.

The present embodiment however employs an AC drive signal and effects the probe position control based on the charge amount, obtained by integration in time of the detected current, generated by the above-mentioned AC drive signal.

More specifically, a V-Q conversion circuit is composed of an AC voltage generator 611, an amplitude modulation circuit 612 capable of amplitude control with variation in the frequency, and an integration circuit 614.

The amplitude modulation circuit 612 generates an AC drive signal Vn by modulating the AC signal (angular frequency ω)) from the AC signal generator as the carrier, with the analog control input signal Un, wherein n indicates the probe number, as indicated by the following equation:

$Vn = Un \cdot \sin\omega t$.

The integrating circuit 614 is composed of an operational amplifier, a resistor R and the equivalent capacitor c formed between the drive electrodes, and controls the current flowing into the equivalent capacitor.

The capacitor 610 is a sample-hold (S/H) capacitor, for storing the control signal Un for determining the amplitude of the oscillator circuit, and holds the distance control signal Un from the Z-servo circuit at the signal switching.

In the following explained is the method of charge control, utilizing the V-Q conversion circuit explained above. At the application of the AC drive signal Vn, the charge accumulated in the equivalent capacitor is represented by:

$$Q = \int i \cdot dt = \int (V/R) \cdot dt$$

wherein V is the input voltage to the integrating circuit, and R is the resistance therein.

When the amplitude modulation circuit 612 generates an output signal $Vn = Un \cdot \sin\omega t$, there stands the following relation for the charge amount Q:

$$Q = -(Un/\omega r) \cdot \cos\omega t$$

As the charge amount is zero in average in time, no voltage is generated in the capacitor formed between the drive electrodes, so that the capacitor of the integrating circuit does not require periodical clearing.

On the other hand, $Q^2$ determining the electrostatic force is given, from the equation (4) as follows:

$$Q^2 = (Un/\omega \cdot R)^2 \cdot (1 + \cos 2\omega t)/2 \tag{8}$$

so that the average of $Q^2$ is given by:

$$Q^2|_{Ave} = (Un/\omega \cdot R)^2/2 \tag{9}$$

Consequently, by selecting a driving frequency larger than the mechanical resonance frequency of the probe, it is rendered possible to set the charge amount by the control input signal Un, thereby controlling the electrostatic force working on the probe. Stated differently, the use of the AC drive signal enables control of the electrostatic actuator, without generation of the potential, averaged in time, between the drive electrodes.

The probe was actually prepared with the structure shown in FIG. 4 and with the following dimensions:
L=100 μm, W=100 μm, t=1 μm,
a=10 μm, b=50 μm.

The mechanical parameters of the torsion-bar probe were estimated as follows. The beam supported at both ends had a rotational elastic constant K as follows:

$$K = 2 \cdot G \cdot t^3 \cdot a \cdot m/b \quad (N \cdot m) \tag{10}$$

wherein G is the Young's modulus, and m is a constant determined by a and t. Also the probe at the tip portion had an elastic constant in the Z-direction:

$$k = K/L^2 \quad (N/m) \tag{11}$$

Calculation according to the equation (11) provides k=0.87 (N/m).

On the other hand, the electrostatic force generated by the voltage application between the fixed electrode 403 and the upper electrode is represented by:

$$F = 1/(2 \cdot \omega_0 \cdot W \cdot L) \cdot Q^2 \quad (N) \tag{12}$$

In the present embodiment, as the probe had a mechanical resonance frequency of 36 kHz in the Z-direction, there was selected a driving frequency of 50 kHz, and the driving operation in the Z-direction was executed according to the equations (9), (11) and (12).

The recording and reproducing operations were conducted in the following manner. A bias voltage of 0.1 V was applied by the voltage application circuit 314, between each probe 300 and the recording medium, and both were brought to a small distance providing a constant tunnelling current (1 nA). Each probe was independently driven in the Z-direction by the Z-servo circuit 308, with feedback control so as to obtain a constant current of 1 nA.

Also based on the distance control signals 309 of the probes, the tilt correction circuit 312 generate an α-rotation signal and a β-rotation signal for correcting the tilt between the multi-probe head 301 and the recording medium and apply those to the Z-actuator 307.

In this state the probe was brought to a desired position on the recording medium 302, and the bias voltage was modulated to apply a pulsed voltage of 6 V between the probe 300 and the recording medium, whereby a record bit of a size of 10 nm φ was formed, allowing a current of ca. 0.1 µA to flow, and, in a scanning operation after the application of the pulsed voltage, this state was found to be retained. Thus, such bit of lower resistance state was defined as "1", while the higher resistance state was defined as "0", and binary recording and reproduction were conducted by encoding data with an encoder 318 and decoding the reproduced binary data with a decoder 319.

In the present embodiment, the electrostatic actuator is driven by an AC voltage and the charge amount control is made by the amplitude of the AC voltage, but such charge amount control can also be achieved by the variation in the driving frequency or in the current limiting resistor, according to the equation (9).

Also the foregoing embodiments employ the tunnelling current as the physical interaction, but there may also be utilized other physical interactions such as interatomic force, magnetic force or evanescent light.

What is claimed is:

1. An information processing apparatus comprising:

a probe;

means for detecting a distance between said probe and an object opposed thereto, based on a physical interaction working between said probe and said object;

an electrostatic actuator for displacing said probe, for adjusting the distance between said probe and said object, said electrostatic actuator including mutually opposed two plate electrodes;

means for detecting a difference between the detected distance and a target distance and for setting a target amount of charge required for compensating said difference; and control means for controlling the amount of charge to be accumulated between said plate electrodes on the basis of said target amount of charge.

2. An information processing apparatus according to claim 1, wherein said object is a recording medium.

3. An information processing apparatus according to claim 1, wherein said object is a specimen to be observed.

4. An information processing apparatus according to claim 1, wherein said physical interaction is a tunnelling current.

5. An information processing apparatus according to claim 1, wherein said physical interaction is evanescent light.

6. An information processing apparatus according to claim 1, wherein said physical interaction is interatomic force.

7. An information processing apparatus according to claim 1, wherein said control means includes means for detecting the amount of charge accumulated between said electrodes and for effecting said control in such a manner that said detected amount of charge becomes equal to a desired charge amount corresponding to said desired distance.

8. An information processing apparatus according to claim 7, wherein said control means effects said control of the charge amount by regulating the current supplied to said electrodes.

9. An information processing apparatus according to claim 7, wherein the detection of amount of charge by said charge amount detection means is effected by using a detecting capacitor disposed serially with a capacitor formed by said electrodes.

10. An information processing apparatus according to claim 7, wherein the detection of amount of charge by said charge amount detection means is effected by measuring the capacity of a capacitor formed between said electrodes.

11. An information processing apparatus according to claim 1, wherein said charge amount control means includes:

means for generating an AC drive signal for driving said electrostatic actuator; and means for modulating an amplitude of said AC drive signal so as to control said amount of charge.

12. An information processing apparatus according to claim 11, wherein the frequency of said AC drive signal is higher than the mechanical resonance frequency of said electrostatic actuator.

13. An information processing apparatus according to claim 1, wherein said charge amount control means includes:

means for generating an AC drive signal for driving said electrostatic actuator; and means for adjusting a frequency of said AC drive signal so as to control said amount of charge.

* * * * *

UNITED STATES PATENT AND TRADEMARK OFFICE
CERTIFICATE OF CORRECTION

PATENT NO. : 5,793,040
DATED : August 11, 1998
INVENTOR(S) : TAKAHIRO OGUCHI, ET AL.

It is certified that error appears in the above-identified patent and that said Letters Patent is hereby corrected as shown below:

On the title page,

AT [56] REFERENCES CITED

FOREIGN PATENT DOCUMENTS

"0 622 562" should read --0 622 652--.

U.S. PATENT DOCUMENTS

"4,726,318" should read --4,724,318-- and
"4,883,859" should read --4,883,959--.

COLUMN 3

Line 44, "$\epsilon$O" should read --$\epsilon 0$--; and
Line 54, "a$\Delta$C" should read --$\Delta C$--.

COLUMN 5

Line 11, "tractor 201," should read --tracter 201,--;
Line 12, "value ZO." should read --value Z0.--;
Line 57, "displacement 6" should read --displacement $\delta$--; and
Line 62, "$\epsilon$O" should read --$\epsilon 0$--.

UNITED STATES PATENT AND TRADEMARK OFFICE
CERTIFICATE OF CORRECTION

PATENT NO. : 5,793,040

DATED : August 11, 1998

INVENTOR(S) : TAKAHIRO OGUCHI, ET AL.

It is certified that error appears in the above-identified patent and that said Letters Patent is hereby corrected as shown below:

COLUMN 6

Line 9, should read:
$$--C = \epsilon 0 \cdot W \cdot L/(2a) \cdot \ln\{(1+a/d)/(1-a/d)\}$$
$$= \epsilon 0 \cdot W \cdot L/d\{1+1/3(a/d)^2+1/5(a/d)^4+...\} \quad (7)$$
$$\simeq \epsilon 0 \cdot W \cdot L/d \text{ (in case of } a<1/5d\text{)}--; \text{ and}$$

Line 54, "a- and p-directions," should read --$\alpha$- and $\beta$-directions,--.

COLUMN 7

Line 24, "316XY" should read --316, XY--.

COLUMN 8

Line 42, "withstands" should read --withstand--.

COLUMN 9

Line 8, "Brodget" should read --Blodgett--;
Line 33, "value ZO" should read --value Z0--; and
Line 65, "$\omega$))" should read --$\omega$)--.

COLUMN 10

Line 10, "explained is" should read --is explained--.

COLUMN 11

Line 22, "generate" should read --generated--; and
Line 25, "apply" should read --applied--.

UNITED STATES PATENT AND TRADEMARK OFFICE
CERTIFICATE OF CORRECTION

PATENT NO. : 5,793,040
DATED : August 11, 1998
INVENTOR(S) : TAKAHIRO OGUCHI, ET AL.

It is certified that error appears in the above-identified patent and that said Letters Patent is hereby corrected as shown below:

COLUMN 12

Line 21, "electrodes" should read --plate electrodes--;
Line 22, "a" should be deleted;
Line 24, should read: --said target amount of charge.--; and
Line 25, "tance." should be deleted.

Signed and Sealed this

First Day of June, 1999

Attest:

Attesting Officer

Q. TODD DICKINSON
Acting Commissioner of Patents and Trademarks